US012774586B2

(12) United States Patent
Zimmerman

(10) Patent No.: US 12,774,586 B2
(45) Date of Patent: Oct. 27, 2026

(54) SYSTEM AND METHOD FOR ESTIMATING A WEIGHT OF A LOAD IN A BUCKET OF A WORK VEHICLE

(71) Applicant: CNH Industrial America LLC, New Holland, PA (US)

(72) Inventor: Joshua D. Zimmerman, Plainfield, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 559 days.

(21) Appl. No.: 17/986,180

(22) Filed: Nov. 14, 2022

(65) Prior Publication Data

US 2024/0159017 A1 May 16, 2024

(51) Int. Cl.
*E02F 9/22* (2006.01)
*E02F 9/26* (2006.01)
*G01G 5/04* (2006.01)
*G01G 19/10* (2006.01)

(52) U.S. Cl.
CPC .............. *E02F 9/2221* (2013.01); *E02F 9/26* (2013.01); *G01G 5/04* (2013.01); *G01G 19/10* (2013.01)

(58) Field of Classification Search
CPC . E02F 9/2221; E02F 9/26; G01G 5/04; G01G 19/10
USPC .......................................................... 701/34.2
See application file for complete search history.

(56) References Cited

U.S. PATENT DOCUMENTS 5,105,896 A 4/1992 Kyrtsos
8,515,627 B2 8/2013 Marathe et al.
10,866,136 B2 12/2020 Leslie et al.
2010/0161185 A1* 6/2010 Marathe .................. E02F 3/431 701/50
2014/0107897 A1* 4/2014 Zhu ......................... E02F 9/264 701/50
2015/0354176 A1* 12/2015 Shatters .................... E02F 3/36 701/50

(Continued)

FOREIGN PATENT DOCUMENTS

DE 102021200407 A1 * 7/2022
JP 4574406 B2 * 11/2010

(Continued)

OTHER PUBLICATIONS

Kuphaldt, T., "Lessons In Industrial Instrumentation", Jan. 4, 2019, Version 2.32, pp. 2179-2207 (Year: 2019).*

*Primary Examiner* — Hunter B Lonsberry
*Assistant Examiner* — Helen Li

(57) ABSTRACT

A method for estimating a weight of a load in a bucket of a work vehicle includes obtaining, via a controller, a speed of an actuator of a lift coupled to the bucket. The method also includes comparing, via the controller, the speed provided to an instantaneous command to a hydraulic valve coupled to the actuator. The method further includes estimating, via the controller, a hydraulic pressure drop across the hydraulic valve based on the comparison of the speed to the instantaneous command to estimate pressures in the cylinder. The method even further includes determining, via the controller, a hydraulic force of the actuator. The method still further includes estimating, via the controller, the weight of the load in the bucket of the work vehicle based on the estimated pressures in the actuator and the hydraulic force.

17 Claims, 5 Drawing Sheets

(56) References Cited

U.S. PATENT DOCUMENTS

| | | | | |
|---|---|---|---|---|
| 2018/0128607 | A1* | 5/2018 | Wang | F15B 21/087 |
| 2019/0145083 | A1* | 5/2019 | Rausch | E02F 3/431<br>60/327 |
| 2019/0145815 | A1* | 5/2019 | Hansen | B66F 17/003<br>177/1 |
| 2020/0011727 | A1* | 1/2020 | Zimmerman | G01G 23/18 |
| 2020/0041331 | A1 | 2/2020 | Hoshino et al. | |
| 2020/0087893 | A1* | 3/2020 | Hageman | E02F 9/268 |
| 2020/0208373 | A1* | 7/2020 | Nakamura | G01G 19/08 |
| 2020/0340213 | A1* | 10/2020 | Zimmerman | G01G 19/12 |
| 2022/0373004 | A1* | 11/2022 | Nose | F15B 11/08 |

FOREIGN PATENT DOCUMENTS

| | | |
|---|---|---|
| KR | 20150075710 | 7/2015 |
| WO | 2009054736 | 4/2009 |
| WO | 2013088816 | 6/2013 |

* cited by examiner

SYSTEM AND METHOD FOR ESTIMATING A WEIGHT OF A LOAD IN A BUCKET OF A WORK VEHICLE

BACKGROUND

The present disclosure relates generally to work vehicles and, more particularly, to a system or method for estimating a weight of a load in a bucket of a work vehicle.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A loader (e.g., wheel loader, skid-steer loader, excavator loader, etc.) is commonly used to load and move substantial volumes of material (e.g., dirt and similar material) from one location to another. A loader includes a relatively large frame and an implement (e.g., bucket) mounted to one end of the frame. The implement may be selectively elevated and selectively tilted to dump materials therefrom. On certain machines, pressure sensors may not be installed to provide feedback related to a load (e.g., payload) in the bucket or attachment of the machine. Machine performance and operator experience can be improved if feedback is available regarding the load in the bucket or attachment on the machine.

BRIEF DESCRIPTION

This brief description is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a method for estimating a weight of a load in a bucket of a work vehicle is provided. The method includes obtaining, via a controller, a speed of an actuator of a lift coupled to the bucket. The method also includes comparing, via the controller, the speed to an instantaneous command provided to a hydraulic valve coupled to the actuator. The method further includes estimating, via the controller, a hydraulic pressure drop across the hydraulic valve based on the comparison of the speed to the instantaneous command to estimate pressures in the actuator. The method even further includes determining, via the controller, a hydraulic force of the actuator. The method still further includes estimating, via the controller, the weight of the load in the bucket of the work vehicle based on the estimated pressures in the actuator and the hydraulic force.

In another embodiment, a processor-based system is provided. The processor-based system includes a non-transitory memory configured to store executable routines. The processor-based system also includes a processor configured to execute the routines stored in the non-transitory memory, wherein the routines, when executed, cause acts to be performed. The acts include obtaining a speed of an actuator of a lift coupled to a bucket of a work vehicle. The acts also include comparing the speed to an instantaneous command provided to a hydraulic valve coupled to the actuator. The acts further include estimating a hydraulic pressure drop across the hydraulic valve based on the comparison of the speed to the instantaneous command to estimate pressures in the actuator. The acts even further include determining a hydraulic force of the actuator. The acts still further include estimating a weight of a load in the bucket of the work vehicle based on the estimated pressures in the actuator and the hydraulic force.

In a further embodiment, one or more non-transitory computer-readable media are provided. The computer-readable media encode one or processor-executable routines. The one or more routines, when executed by a processor, cause acts to be performed. The acts include obtaining a speed of an actuator of a lift coupled to a bucket of a work vehicle. The acts also include comparing the speed to an instantaneous command provided to a hydraulic valve coupled to the actuator. The acts further include estimating a hydraulic pressure drop across the hydraulic valve based on the comparison of the speed to the instantaneous command to estimate pressures in the actuator. The acts even further include determining a hydraulic force of the actuator. The acts still further include estimating a weight of a load in the bucket of the work vehicle based on the estimated pressures in the actuator and the hydraulic force.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate generally to estimating a load (e.g. payload) in a bucket of a work vehicle (e.g., wheel loader, skid-steer loader, excavator loader, etc.) where pressure sensors are absent or not installed. In particular, a hydraulic payload system (e.g., having an open center valve control system or non-load sensing hydraulic system) may include a controller that utilizes a controller that executes a control algorithm (which serves as a pressure observer) to monitor a speed (via positions sensors) of an actuator (e.g., hydraulic cylinder) coupled to the bucket and compares it in relation to an instantaneous valve command provided to a hydraulic valve coupled to the actuator. Based on the known kinematics and/or inertial properties of an actuator system including the actuator and the speed of the actuator, the controller is configured to estimate the load in the bucket of the work vehicle. Knowledge of the load may help the performance of the systems (e.g., hydraulic payload system, actuator system, etc.). In addition, knowledge of the load can provide useful feedback to the operator of the work vehicle about their productivity. The disclosed embodiments provide the estimate of the load in the bucket without adding cost, instrumentation, and controller input/output to the system.

Figure 1:
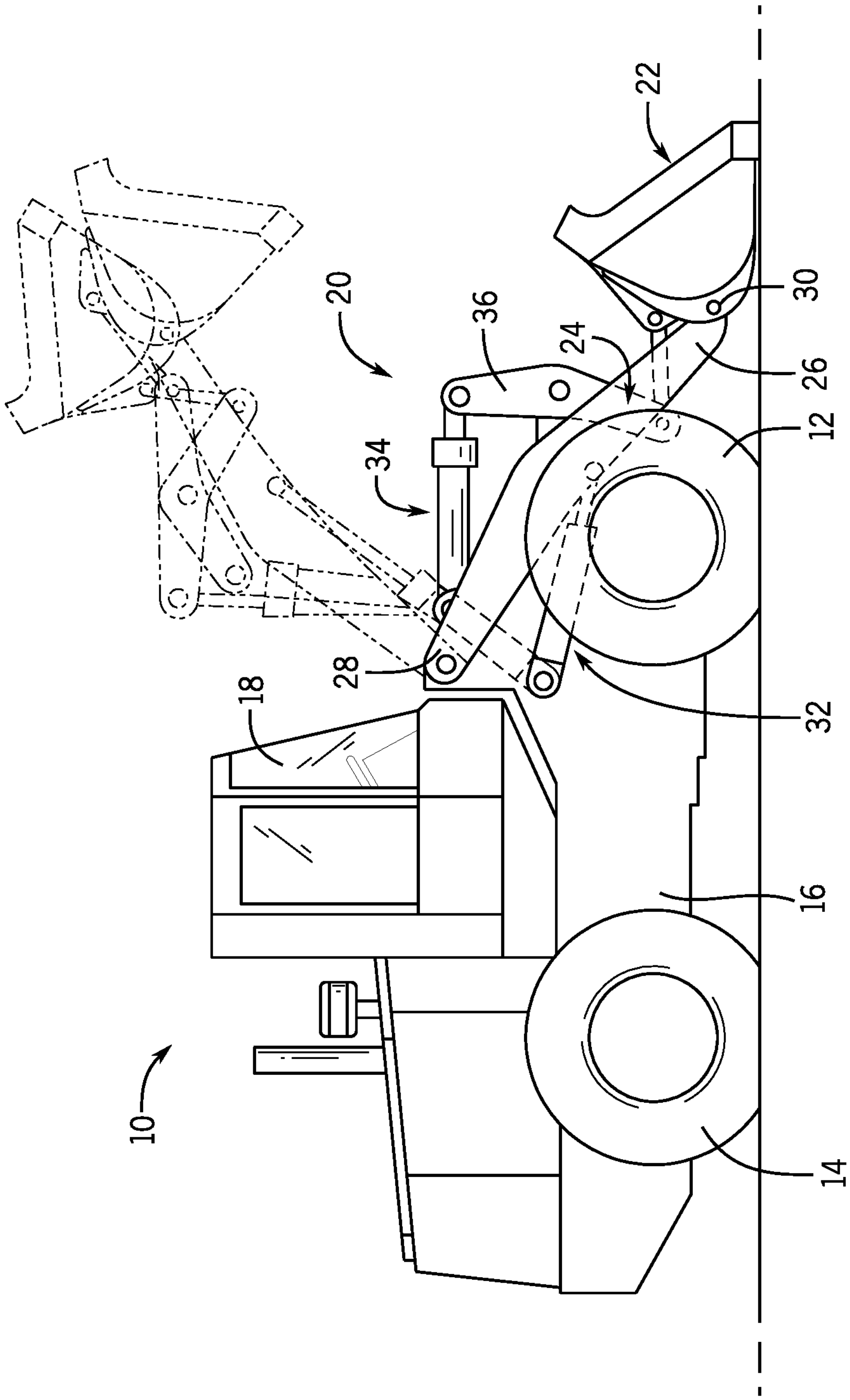
FIG. 1 illustrates a side view of a work vehicle (e.g., wheel loader) equipped with an implement (e.g., bucket), in accordance with aspects of the disclosure.

FIG. 1 illustrates a side view of a work vehicle 10 (e.g., wheel loader) equipped with an implement 22 (e.g., bucket). In certain embodiments, the work vehicle may be a skid-steer loader, an excavator loader, or any other type of loader having the implement 22 for handling a load. As shown, the work vehicle 10 includes a pair of front tires 12, (one of which is shown), a pair of rear tires 14 (one of which is shown) and a frame or chassis 16 coupled to and supported by the tires 12, 14. An operator's cab 18 may be supported by a portion of the chassis 16 and may house various input devices for permitting an operator to control the operation of the work vehicle 10.

Moreover, as shown in FIG. 1, the work vehicle 10 may include a lift assembly 20 (e.g., actuation system) for raising and lowering a suitable implement 22 (e.g., a bucket) relative to a driving surface of the vehicle 10. In several embodiments, the lift assembly 20 may include a pair of loader arms 24 (one of which is shown) pivotally coupled between the chassis 16 and the implement 22. For example, as shown in FIG. 1, each loader arm 24 (e.g., boom) may include a forward end 26 and an aft end 28, with the forward end 26 being pivotally coupled to the implement 22 at a forward pivot point 30 and the aft end 28 being pivotally coupled to a portion of the chassis 16.

In addition, the lift assembly 20 may also include a pair of hydraulic lift cylinders 32 (one of which is shown) coupled between the chassis 16 and the loader arms 24 and a hydraulic tilt cylinder 34 coupled between the chassis 16 and the implement 22 (e.g., via a pivotally mounted bell crank plate 36 or other mechanical linkage). It should be readily understood by those of ordinary skill in the art that the lift and tilt cylinders 32, 34 may be utilized to allow the implement 22 to be raised/lowered and/or pivoted relative to the driving surface of the work vehicle 10. For example, the lift cylinders 32 may be extended and retracted in order to pivot the loader arms 24 upward and downwards, respectively, thereby at least partially controlling the vertical positioning of the implement 22 relative to the driving surface. Similarly, the tilt cylinder 34 (e.g., bucket cylinder) may be extended and retracted in order to pivot the implement 22 relative to the loader arms 24 about the forward pivot point 30, thereby controlling the tilt angle or orientation of the implement 22 relative to the driving surface or ground. The number of linkages and/or cylinders of the lift assembly 20 may vary.

An actuation system (e.g., the lift assembly 20) for the implement 22 of the work vehicle 10 lacks pressure sensors for providing feedback related to a weight of the load. In certain embodiments, a hydraulic payload system of the work vehicle 10 utilizes an open center valve control system or non-load sensing hydraulic system where the flow from a pump through a hydraulic valve (or through the hydraulic valve to a tank) is dependent on a valve opening position and the hydraulic pressure (as a result of the load on the system). As described herein, this information can be sued to generate an estimate of a weight of the load in the implement 22. In certain embodiments, the hydraulic payload system of the work vehicle 10 includes a controller that utilizes a control algorithm (which serves as a pressure observer) to monitor a speed (via positions sensors) of an actuator (e.g., hydraulic cylinder) coupled to the implement 22 and compares it in relation to an instantaneous valve command provided to a hydraulic valve coupled to the actuator. Based on the known kinematics and/or inertial properties of an actuator system including the actuator and the speed of the actuator, the controller is configured to estimate a weight of the load in the implement 22 (e.g., bucket) of the work vehicle 10.

Figure 2:
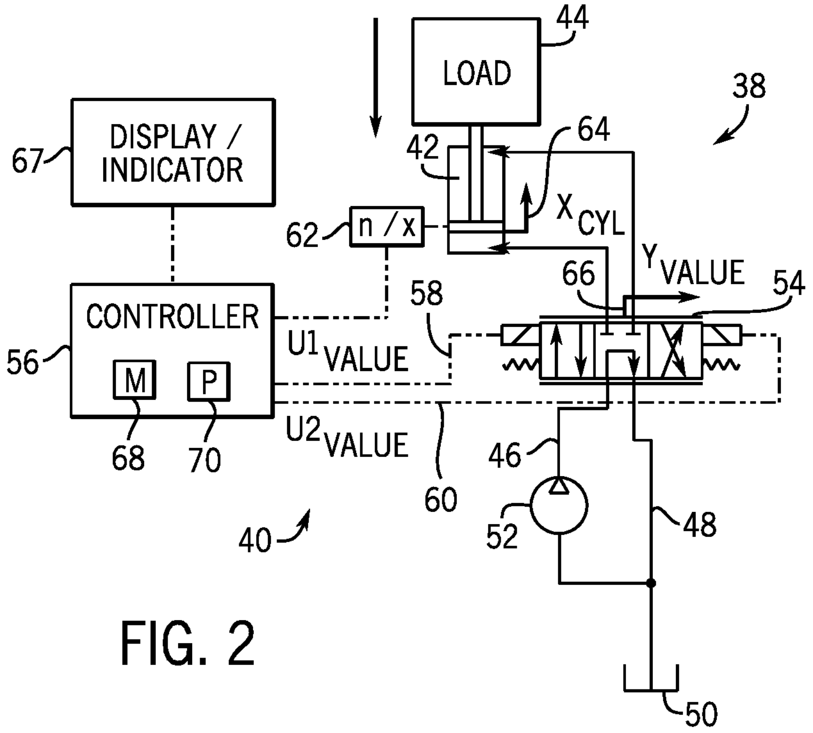
FIG. 2 illustrates a schematic diagram of a hydraulic payload system of the work vehicle in FIG. 1, in accordance with aspects of the present disclosure.

FIG. 2 is a schematic diagram of a hydraulic payload system 38 of the work vehicle 10 in FIG. 1. The hydraulic payload system 38 includes a control system 40 (e.g., electro-hydraulic control system) coupled to an actuator 42 (e.g., cylinder such as a bucket cylinder). The actuator 42 is coupled to an implement (e.g., implement 22 in FIG. 1) such as a bucket and, thus, a load 44 (e.g., payload) disposed in the implement. As noted above, the actuation system for the implement lacks pressure sensors. Fluid (e.g., hydraulic fluid) flow along conduits 46, 48 controls the operation of the actuator 42 and, thus, movement (and position) of the implement in a vertical direction relative to the ground (e.g., raising or lowering the implement). In certain embodiments, operation of the actuator involves changing a tilt position of the implement (e.g., bucket) about its horizontal axis. Fluid is provided from a reservoir 50 (e.g., tank) to the actuator 42 along the conduit 46 via a pump 52. Fluid is returned to the reservoir 50 via the conduit 48. A control valve 54 (e.g., electro-hydraulic valve) may be disposed along the conduits 46, 48. As depicted, the control valve 54 is a tandem center control valve. In certain embodiments, the control valve 54 may be an open center control valve. The control valve 54 is responsive to control signals from a controller 56 that causes the control valve 54 to regulate fluid flow to and from the actuator 42. For example, $u1_{valve}$ 58 is a command in a lift direction (relative to the ground) and $u2_{valve}$ 60 is a command in a lower direction (e.g., relative to the ground).

The controller 56 also receives feedback from one or more position sensors 62 coupled to the actuator 42. The one or more position sensors 62 may include a linear sensor or a joint angle or tilt sensor using kinematics. For example, the feedback received from the one or more position sensors 62 includes a position measurement $x_{cyl}$ 64 (e.g., cylinder position measurement) of the actuator 42. In certain embodiments, the controller 56 also receives feedback from a valve position sensor coupled to the control valve 54. For example, the feedback received from the valve position sensor is a valve spool position $y_{valve}$ 66.

The hydraulic payload system 38 utilizes an open center valve control system or non-load sensing hydraulic system where the flow from the pump 52 through the control valve 54 (or through the control valve 54 to the reservoir 50) is dependent on a valve opening position and the hydraulic pressure (as a result of the load on the system). This information can be used to generate an estimate of a weight of the load 44. Flow through an orifice is proportional to the square root of delta pressure. Using these known relations or using empirical mapping of valve command and pressure to flow measured on a bench, the controller 56 is programmed to estimate the pressure in the hydraulic system (e.g., hydraulic pressure drop across the control valve 54). In particular, the controller 56 utilizes a control algorithm (which serves as a pressure observer) to monitor a speed (via positions sensors 62) of the actuator 42 (e.g., hydraulic cylinder) coupled to the implement (e.g., bucket) and compares it in relation to an instantaneous valve command (e.g., $u1_{valve}$ 58 or $u2_{valve}$ 60) provided to the control valve 54 coupled to the actuator 42. Based on the known kinematics and/or inertial properties of an actuator system (including the actuator 42 and linkages such as a boom) and the speed of the actuator 42, the controller 56 is configured to estimate a weight of the load in the implement (e.g., bucket) of the work vehicle 10.

In certain embodiments, the controller 56 may be coupled to a display or indicator 67. The controller 56 causes feedback on the weight of the load 44 to be provided to the operator of the work vehicle 10.

The controller 56 contains computer-readable instructions stored in memory 68 (e.g., non-transitory, tangible, and computer-readable medium/memory circuitry) and a processor 70 which executes the instructions. More specifically, the memory 68 may include volatile memory, such as random access memory (RAM), and/or non-volatile memory, such as read-only memory (ROM), optical drives, hard disc drives, or solid-state drives. Additionally, the processor 70 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The processor 70 and memory 68 may be used collectively to support an operating system, software applications and systems, and so forth, useful implementing the techniques described herein. For example, the memory 68 may store instructions for estimating a pressure drop across the control valve 54 (without feedback from pressure sensors) utilizing a control algorithm as a pressure observer. Also, the memory 68 may store instructions for estimating a weight of the load 44 in the implement (e.g., bucket). The memory 68 may store a variety of maps derived from calibration.

As theoretical calculations relating pressure to weight have the challenge of unknown factors such as friction or inaccuracies in the manufacturing or model properties, calibration of the system (e.g., actuator system) may be done. The calibration could be done by lifting and/or lowering a known load one or more known valve commands and measuring the speed of the actuator 42. Because this speed will be load dependent a mapping can be created between the actuator speed and load weight to predict the weight of the load 44 in the implement (e.g., bucket).

Figure 3:
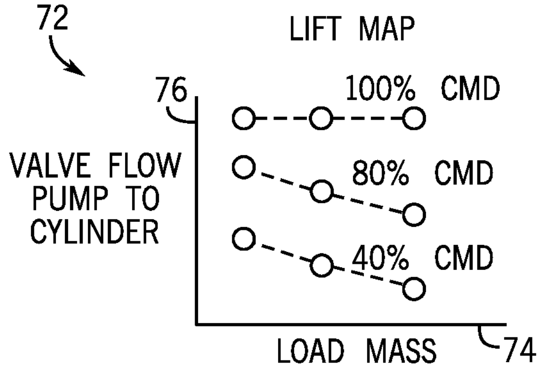
FIG. 3 illustrates a graph representing a lift map for calibration, in accordance with aspects of the present disclosure.
Figure 4:
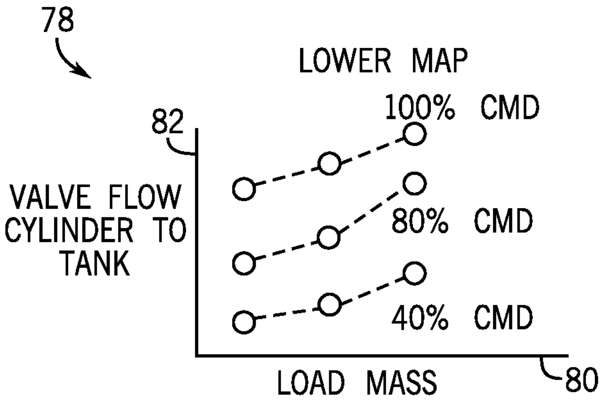
FIG. 4 illustrates a graph representing a lower map for calibration, in accordance with aspects of the present disclosure.

In certain embodiments, a direct calibration is performed to correlate mass to valve flow at different valve commands. FIGS. 3 and 4 provide examples of a lift map (e.g., for a lift valve command) and a lower map (e.g., for a lower valve command). FIG. 3 includes a graph 72 illustrating the lift map with an x-axis 74 representing load mass and a y-axis 76 representing valve flow from the pump to the cylinder. FIG. 4 includes a graph 78 illustrating the lower map with an x-axis 80 representing load mass and a y-axis 82 representing valve flow from the cylinder (e.g., actuator) to the tank (e.g., reservoir). To generate the maps, a number of known masses (3 known masses in FIGS. 3 and 4) are put in the loader bucket. For each mass, a number of commands (3 commands in FIGS. 3 and 4) are given. For each command, the response velocity/flow of the control valve to the cylinder (e.g., actuator) is measured with the position sensor (e.g., coupled to the cylinder) or other type of sensor from which flow can be derived. Once the data is collected, the mass can be estimated utilizing inverse mapping using the percent valve command and the measured valve flow as inputs to predict the system load. As depicted in FIGS. 3 and 4, this was done for lift and lower directions, respectively. In certain embodiments, for better accuracy, the estimation procedure could require the controller to provide a constant command as one of the calibration points during estimation. For the hydraulic payload system 38 in FIG. 2, at 100 percent lift command, the mass/flow relationship is lost because all flow must go through the control valve regardless of the load, so the lift calibration is only valid for commands below 100 percent.

Figure 5:
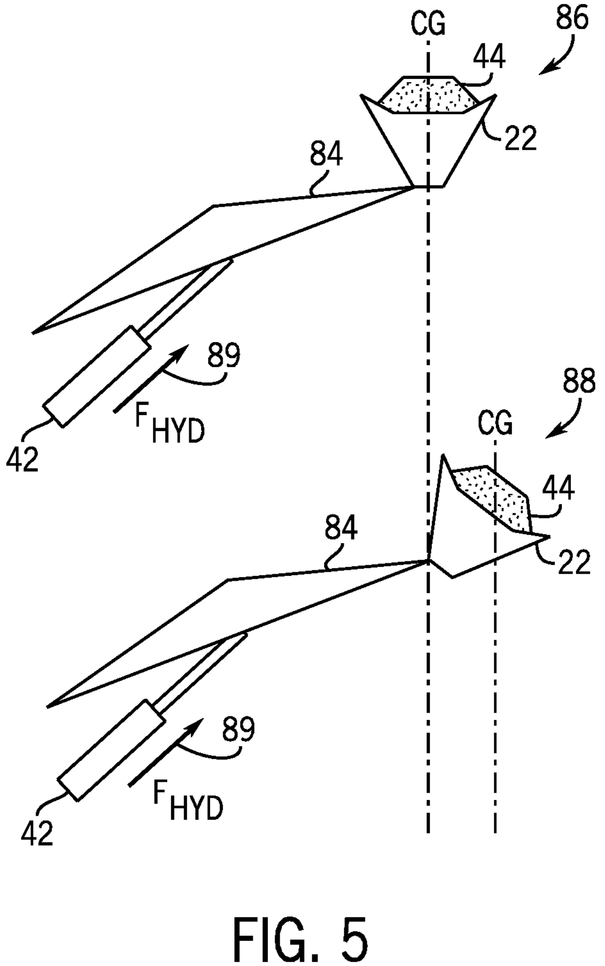
FIG. 5 illustrates different actuation positions of a load in a bucket and the effect on a center of gravity, in accordance with aspects of the present disclosure.

FIG. 5 illustrates different actuation positions of a load in a bucket and the effect on a center of gravity (CG). FIG. 5 depicts the load 44 disposed in the implement 22 (e.g. bucket) and the actuator 42 (e.g., hydraulic cylinder) coupled to the implement 22 via a linkage 84 (e.g., boom). The load 44 in the implement 22 is shown at a same height but in two different tilt positions (e.g., tilt position 86 and tilt position 88). For a given actuator 42 used to lift the load 44, the hydraulic force 89 ($F_{hyd}$) can be found from the pressures and the cylinder areas. Also, the zero load expected force can found using the known linkage masses and kinematics. Alternatively, the zero load force can be calibrated on the machine doing a lift/lower cycle. Further, forces above the zero load force can be assumed to be the load 44 in the in the implement 22 and from this increased load and kinematic knowledge of the vehicle, the mass in the implement 22 can be estimated. For linkages with more than one link, like a loader and a bucket, the bucket position could move relative to the loader linkage (e.g., linkage 84) moving the center of gravity of the load 44 as depicted in movement between the positions 86, 88. The different tilts positions 86, 88 result in different centers of gravity and different pressure loads for the same load position. With a sensor measuring the linkage 84 (e.g., position of the linkage 84), this shift in the center of gravity can be anticipated and used to adjust the mass calculation for the observed load. The equations utilized for this relationship are dependent on specific linkage kinematics and any number of kinematics are possible. Since pressure sensors are not present, a method (as described below) to estimate the pressure on both sides of the cylinder is needed.

Figure 6:
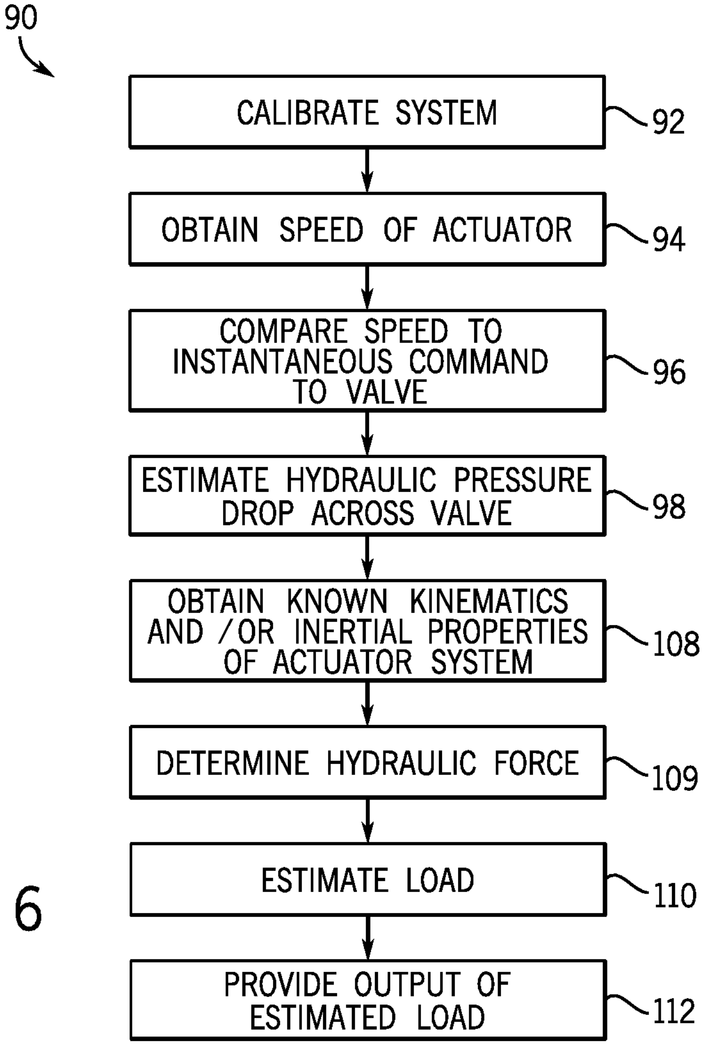
FIG. 6 illustrates a flow chart of a method for estimating a weight of a load in a bucket of a work vehicle, in accordance with aspects of the present disclosure.

FIG. 6 illustrates a flow chart of a method 90 for estimating a weight of a load in a bucket of a work vehicle. One or more of the steps may be performed by the controller 56 in FIG. 2. One or more of the steps of the method 90 may be performed in a different order or simultaneously from that depicted in FIG. 6. In utilizing the method 90, it is assumed that a hydraulic payload system of the work vehicle utilizes an open center valve control system or non-load sensing hydraulic system where the flow from a pump through a hydraulic valve (or through the hydraulic valve to a tank) is dependent on a valve opening position and the hydraulic pressure (as a result of the load on the system). In addition, it is assumed that the actuation system lacks pressure sensors.

In certain embodiments, the method 90 includes calibrating the actuation system (block 92). The calibration may enable the generation of maps correlating mass to valve flow at different valve commands as described herein. Alternatively, in certain embodiments, the method 90 includes obtaining the calibration data. The method 90 also includes obtaining a speed of an actuator of the boom or lift (e.g., coupled to the bucket) (block 94). The speed is obtained or derived from position measurements provided by one or more position sensors coupled to the actuator. The method 90 further includes comparing the speed to an instantaneous command provided to a hydraulic valve (e.g., control valve) coupled to the actuator (block 96).

The method 90 still further includes estimating a hydraulic pressure drop across the hydraulic valve based on the comparison of the speed to the instantaneous command to estimate pressures in the actuator (block 98). Estimating the hydraulic pressure drop occurs in the absence of pressure measurements from one or more pressure sensors. In addition, estimating the pressures in actuator includes estimating a respective pressure on both sides of the actuator (e.g., hydraulic cylinder). Estimating the respective pressure on both sides of the hydraulic cylinder includes determining a bypass opening area of the hydraulic valve based on the instantaneous command or a spool position (e.g., received from a position sensor coupled to the control valve or from known command versus spool position relationship derived from bench data) of the hydraulic valve.

The pressure ($p_{tcyl}$) in the actuator (e.g., hydraulic cylinder) on the side connected to tank or reservoir can be determined from the following valve flow equation:

$$Q=K*A*\mathrm{sqrt}(p_{tcyl}-p_t), \quad (1)$$

where Q represents valve flow, K represents flow gain, A represents valve opening area, and $p_t$ represents pressure downstream of the hydraulic valve. Q can be measured based on cylinder area (e.g. annular or piston depending on side) and measured cylinder speed. K is an empirical value considering fluid viscosity and flow geometries. K is determined by a supplier or using bench data. K is typically determined by measuring flow rate at a nominal constant pressure drop across the valve at a nominal valve opening. A is mapped from command or spool position. A is found from a known relationship between valve command/position and valve opening area. The $p_t$ can be assumed to be zero, a constant low pressure drop for a return check valve, or any other method of estimating the tank return line based on flow rate (empirical data) or an equation similar the valve flow equation 1. After obtaining the above parameters, $p_{tcyl}$ can be solved for directly.

Figure 7:
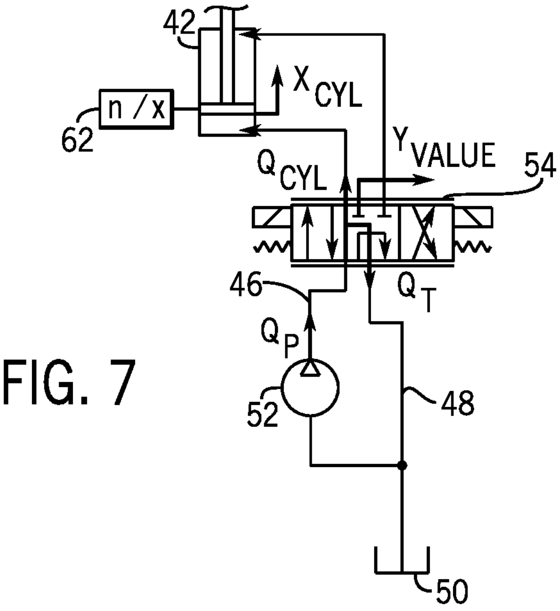
FIG. 7 illustrates a schematic diagram of a portion of the hydraulic payload system in FIG. 2 depicting various valve flows, in accordance with aspects of the present disclosure.

Referring to FIG. 7, determining pump side pressure ($p_{pcyl}$, i.e., the pressure in the hydraulic cylinder 42 on side connected to pump 52 through valve opening) in the actuator 42 (e.g., hydraulic cylinder) is a little more complex but is found using similar equations. Both $p_{tcyl}$ and $p_{pcyl}$ are needed to calculate cylinder force. The tank and pump sides of the hydraulic cylinder will change depending on which direction the hydraulic valve is commanded. The pump side pressure can be determined from the following general valve flow equation:

$$Q=K*A*\mathrm{sqrt}(p_1-p_2). \quad (2)$$

However, in this case a pressure drop from the pump 52 to the tank 50 must be found first, this is from the pump flow ($Q_p$) going through the valve 54 as depicted in FIG. 7. Then a pressure drop from pump 52 to the cylinder may be determined. A calibration or known mapping would be needed to know the pressure/flow relationships for both the pump/tank bypass channel and the pump/cylinder valve opening. The valve bypass flow from pump 52 to tank 50 ($Q_t$) is determined from the following equation:

$$Q_t=Q_p-Q_{cyl}, \quad (3)$$

where $Q_{cyl}$ represents pump flow to the cylinder 42. $Q_{cyl}$ is known from cylinder speed and cylinder area. $Q_p$ is known from engine speed and pump size. $Q_t$ can be determined with the following equation:

$$Q_t=K_t*A_t*\mathrm{sqrt}(p_p-p_t), \quad (4)$$

where $A_t$ represents the bypass opening area, $K_t$ represents bypass flow gain, $p_t$ represents tank pressure, and $p_p$ represents pump pressure. $A_t$ is known as a function of command or spool position. $K_t$ is known from bench data (empirical data) of the valve. The $p_t$ is assumed to be zero or some pressure as a function of flow for line losses. The $p_p$ can be directly solved having defined the remaining parameters in equation 4. The $p_{pcyl}$ is then determined from the following equation:

$$Q_{cyl}=K_v*A_v*\mathrm{sqrt}(p_p-p_{pcyl}), \quad (5)$$

where $A_v$ represents the valve opening area, $K_v$ represents valve flow gain, and $p_p$ represents pump pressure as solved for in equation 4. $A_v$ is known as a function of command or spool position. $K_v$ is known from bench data (empirical data) of the valve. The $p_{pcyl}$ can be directly solved having defined the remaining parameters in equation 5. In certain embodiments, instead of the above equations empirical data and interpolation may be used in place of the equations.

Figure 8:
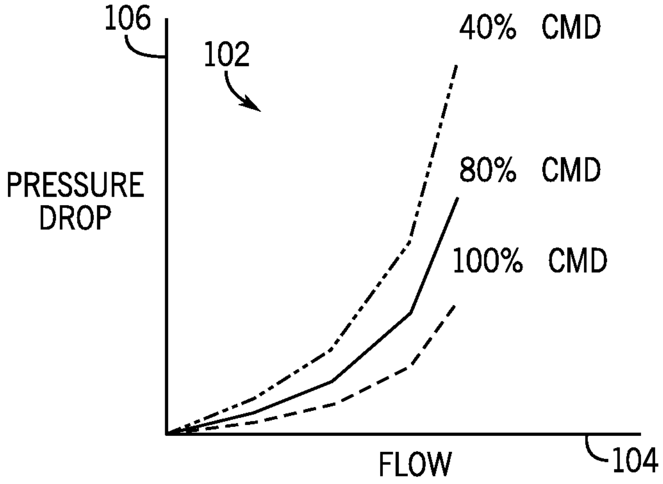
FIG. 8 illustrates a graph of pressure drop across a hydraulic valve relative to valve flow for different valve commands, in accordance with aspects of the present disclosure.

The relationship between the pressure drop across the hydraulic valve and valve flow for a number of valve commands (e.g., 3 commands) is depicted in FIG. 8. Graph 102 in FIG. 8 includes an x-axis represents hydraulic flow 104 and the y-axis represents pressure drop 106.

Returning to FIG. 6, in certain embodiments, the method 90 further includes obtaining known kinematics and inertial properties of the actuator system configured to move the bucket, wherein the actuator system comprises the actuator (block 108). In certain embodiments, this may occur prior to estimating the hydraulic pressure drop across the hydraulic valve as some of these known kinematics or inertial properties may be utilized in algorithms for estimating the hydraulic pressure drop.

The method 90 includes determining a hydraulic force of the actuator (block 109). In certain embodiments, the hydraulic force may be determined based on the known kinematics and inertial properties of the actuator system. In certain embodiments, the hydraulic force may be determined based calibration data.

The method 90 even further includes estimating the weight of the load in the bucket of the work vehicle based on the estimated pressures in the actuator and the determined hydraulic force (block 110). In certain embodiments, the method 90 still further includes providing an output of the estimated weight of the load (block 112). For example, the estimated weight of the load may be provided on a display or indicator to provide feedback to the operator.

Figure 9:
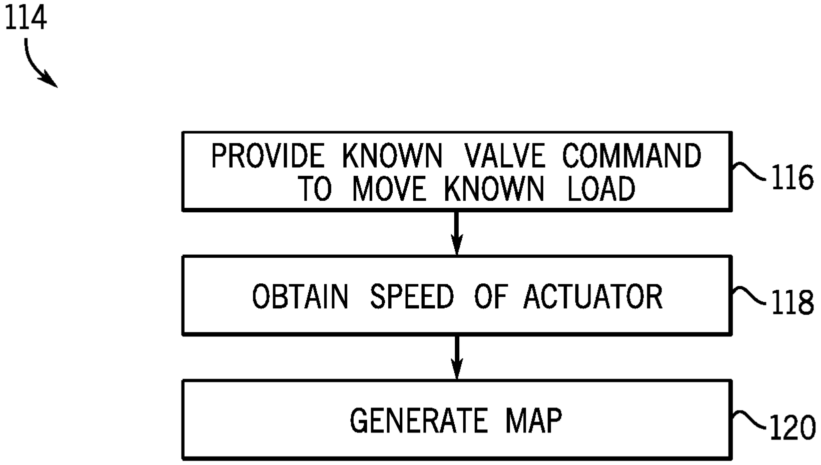
FIG. 9 illustrates a flow chart of a method for calibrating an actuation system of a bucket on a work vehicle, in accordance with aspects of the present disclosure.

FIG. 9 illustrates a flow chart of a method 114 for calibrating an actuation system of a bucket on a work vehicle. One or more of the steps may be performed by the controller 56 in FIG. 2. One or more of the steps of the method 114 may be performed in a different order or simultaneously from that depicted in FIG. 9. The method 114 includes providing a known valve command to move a known load weight in the bucket (block 116). The method 114 also includes obtaining the speed of the actuator of the boom or lift (e.g., coupled to the bucket) (block 118). The method 114 further includes generating a map between the speed of the actuator and a load weight in the bucket (block 120). Maps may be generated for different commands (e.g., lift valve command or lower valve command).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]" or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for estimating a weight of a load in a bucket of a work vehicle, comprising:

obtaining, via a controller, a speed of a hydraulic cylinder of a lift coupled to the bucket;

comparing, via the controller, the speed to an instantaneous command provided to a hydraulic valve coupled to the hydraulic cylinder;

estimating, via the controller, pressures in the hydraulic cylinder by estimating a hydraulic pressure drop across the hydraulic valve based on the comparison of the speed to the instantaneous command;

determining, via the controller, a hydraulic force of the hydraulic cylinder;

estimating, via the controller, the weight of the load in the bucket of the work vehicle based on the estimated pressures in the hydraulic cylinder and the hydraulic force, wherein estimating both the weight of the load in the bucket and the hydraulic pressure drop occurs in the absence of pressure measurements from one or more pressure sensors; and actuating, via the controller, the hydraulic cylinder based on an estimated weight of the load as estimated based on the estimated pressures in the hydraulic cylinder and the hydraulic force.

2. The method of claim 1, wherein the speed of the hydraulic cylinder is obtained from position measurements from one or more position sensors coupled to the hydraulic cylinder.

3. The method of claim 1, wherein the estimated pressures comprise a respective pressure on both sides of the hydraulic cylinder.

4. The method of claim 3, wherein estimating the respective pressure on both sides of the hydraulic cylinder comprises determining a bypass opening area of the hydraulic valve based on the instantaneous command or a spool position of the hydraulic valve.

5. The method of claim 4, further comprising obtaining, via the controller, the spool position of the hydraulic valve via a valve position sensor coupled to the hydraulic valve.

6. The method of claim 1, further comprising calibrating, via the controller, an actuator system of the bucket, wherein the actuator system comprises the hydraulic cylinder.

7. The method of claim 6, wherein calibrating the actuator system comprises:

providing, via the controller, a known valve command to move a known load weight in the bucket;

obtaining, via the controller, the speed of the hydraulic cylinder; and generating, via the controller, a map between the speed of the hydraulic cylinder and a load weight in the bucket.

8. A processor-based system, comprising:

a non-transitory memory configured to store executable routines; and a processor configured to execute the routines stored in the non-transitory memory, wherein the routines, when executed, cause acts to be performed, comprising:

obtaining a speed of a hydraulic cylinder of a lift coupled to a bucket;

comparing the speed to an instantaneous command provided to a hydraulic valve coupled to the hydraulic cylinder;

estimating pressures in the hydraulic cylinder by estimating a hydraulic pressure drop across the hydraulic valve based on the comparison of the speed to the instantaneous command;

determining a hydraulic force of the hydraulic cylinder;

estimating a weight of a load in the bucket of the work vehicle based on the estimated pressures in the hydraulic cylinder and the hydraulic force, wherein estimating both the weight of the load in the bucket and the hydraulic pressure drop occurs in the absence of pressure measurements from one or more pressure sensors; and actuating the hydraulic cylinder based on an estimated weight of the load as estimated based on the estimated pressures in the hydraulic cylinder and the hydraulic force.

9. The processor-based system of claim 8, wherein the speed of the hydraulic cylinder is obtained from position measurements from one or more position sensors coupled to the hydraulic cylinder.

10. The processor-based system of claim 8, wherein the estimated pressures comprise a respective pressure on both sides of the hydraulic cylinder.

11. The processor-based system of claim 10, wherein estimating the respective pressure on both sides of the hydraulic cylinder comprises determining a bypass opening area of the hydraulic valve based on the instantaneous command or a spool position of the hydraulic valve.

12. The processor-based system of claim 11, wherein the routines, when executed, cause acts to be performed further comprising obtaining the spool position of the hydraulic valve via a valve position sensor coupled to the hydraulic valve.

13. The processor-based system of claim 8, wherein the routines, when executed, cause acts to be performed further comprising calibrating an actuator system of the bucket, wherein the actuator system comprises the hydraulic cylinder.

14. The processor-based system of claim 13, wherein calibrating the actuator system comprises:

providing a known valve command to move a known load weight in the bucket;

obtaining the speed of the hydraulic cylinder; and generating a map between the speed of the hydraulic cylinder and a load weight in the bucket.

15. One or more non-transitory computer-readable media encoding one or more processor-executable routines, wherein the one or more routines, when executed by a processor, cause acts to be performed comprising:

obtaining a speed of a hydraulic cylinder of a lift coupled to a bucket of a work vehicle;

comparing the speed to an instantaneous command provided to a hydraulic valve coupled to the hydraulic cylinder;

estimating pressures in the hydraulic cylinder by estimating a hydraulic pressure drop across the hydraulic valve based on the comparison of the speed to the instantaneous command;

determining a hydraulic force of the hydraulic cylinder;

estimating a weight of a load in the bucket of the work vehicle based on the estimated pressures in the hydraulic cylinder and the hydraulic force, wherein estimating both the weight of the load in the bucket and the hydraulic pressure drop occurs in the absence of pressure measurements from one or more pressure sensors; and actuating the hydraulic cylinder based on an estimated weight of the load as estimated based on the estimated pressures in the hydraulic cylinder and the hydraulic force.

16. The one or more non-transitory computer-readable media of claim 15, wherein the speed of the hydraulic cylinder is obtained from position measurements from one or more position sensors coupled to the actuator.

17. The one or more non-transitory computer-readable media of claim 15, wherein the routines, when executed, by the processor cause acts to be performed further comprising calibrating the actuator system by:

providing a known valve command to move a known load weight in the bucket;

obtaining the speed of the hydraulic cylinder; and generating a map between the speed of the hydraulic cylinder and a load weight in the bucket.

* * * * *